(12) United States Patent
Ihara

(10) Patent No.: US 10,620,601 B2
(45) Date of Patent: Apr. 14, 2020

(54) CONTROL DEVICE, CONTROL SYSTEM, AND SEARCH METHOD

(71) Applicant: Panasonic Intellectual Property Management Co., Ltd., Osaka (JP)

(72) Inventor: Kosuke Ihara, Nara (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 351 days.

(21) Appl. No.: 15/617,967

(22) Filed: Jun. 8, 2017

(65) Prior Publication Data

US 2017/0357234 A1 Dec. 14, 2017

(30) Foreign Application Priority Data

Jun. 13, 2016 (JP) .................................. 2016-117392

(51) Int. Cl.

| | |
|---|---|
| *G06F 16/00* | (2019.01) |
| *G05B 19/042* | (2006.01) |
| *H05B 37/02* | (2006.01) |
| *G06F 16/2455* | (2019.01) |

(52) U.S. Cl.
CPC ..... *G05B 19/0426* (2013.01); *G05B 19/0423* (2013.01); *H05B 37/0254* (2013.01); *G05B 2219/25296* (2013.01); *G06F 16/2455* (2019.01)

(58) Field of Classification Search
None
See application file for complete search history.

(56) References Cited

U.S. PATENT DOCUMENTS

| | | | | |
|---|---|---|---|---|
| 2006/0256811 | A1 | 11/2006 | Saito et al. | |
| 2014/0028200 | A1* | 1/2014 | Van Wagoner | .... H05B 37/0272 315/158 |
| 2014/0168967 | A1* | 6/2014 | Itami | ...................... F21V 21/15 362/233 |
| 2014/0285117 | A1* | 9/2014 | Matsumoto | ............ H05B 37/02 315/320 |
| 2015/0084546 | A1* | 3/2015 | Kubo | ................. H05B 37/0254 315/309 |

(Continued)

FOREIGN PATENT DOCUMENTS

| | | |
|---|---|---|
| JP | H05-242973 A | 9/1993 |
| JP | 2002-354556 A | 12/2002 |

(Continued)

*Primary Examiner* — Son T Hoang
(74) *Attorney, Agent, or Firm* — McDermott Will & Emery LLP

(57) ABSTRACT

A control device searches for a device to which a global identification (ID) including a manufacturer ID and a device ID is assigned in advance, by searching for the global ID. The manufacturer ID is set for each manufacturer using m bits, and the device ID is uniquely set by each manufacturer using n bits. M and n each are a natural number. The control device includes: a storage storing the manufacturer ID; an inquirer designating a possible range of the global ID at a time when m bits indicated by the manufacturer ID stored in the storage are fixed, and making, to devices connected to the control device, an inquiry about whether a global ID assigned to the device is in the possible range; and a receiver receiving, from the devices, a response to the inquiry, the response indicating that the global ID is in the possible range.

8 Claims, 5 Drawing Sheets

(56) References Cited

U.S. PATENT DOCUMENTS

2015/0373813 A1    12/2015    Nieuwlands

FOREIGN PATENT DOCUMENTS

| JP | 2006-319491 | A | 11/2006 |
| JP | 2011-070961 | A | 4/2011 |
| JP | 2013-127924 | A | 6/2013 |
| JP | 2014-120351 | A | 6/2014 |
| JP | 2014-236309 | A | 12/2014 |
| JP | 2015-060806 | A | 3/2015 |
| JP | 2015-093026 | A | 5/2015 |
| JP | 2015-185451 | A | 10/2015 |
| JP | 2016-509346 | A | 3/2016 |
| WO | 2014/118663 | A1 | 8/2014 |

* cited by examiner

FIG. 2

| MANUFACTURER ID (16 BITS) | DEVICE ID (32 BITS) |
|---|---|

GLOBAL ID

FIG. 3

| MANUFACTURER ID |
|---|
| 0x1111 |
| 0x2222 |
| 0x3333 |

CONTROL DEVICE, CONTROL SYSTEM, AND SEARCH METHOD

CROSS REFERENCE TO RELATED APPLICATION

This application claims the benefit of priority of Japanese Patent Application Number 2016-117392 filed on Jun. 13, 2016, the entire content of which is hereby incorporated by reference.

BACKGROUND

1. Technical Field

The present disclosure relates to a control device and a control system which search for devices connected to the control device, and a search method for searching devices connected to a control device.

2. Description of the Related Art

A system is known which controls devices (e.g., luminaires). The devices are connected to a control device for controlling the devices. The devices are each assigned in advance a global identification (ID) which is unique identification information, and the control device searches for the devices connected to the control device, by searching for the global IDs. By completing the search for the devices, the control device is capable of determining what global IDs the devices connected to the control device are assigned, which makes it possible to communicate with, for example, the devices using the global IDs of the devices for which the search has been completed. Patent Literature (PTL) 1 (Japanese Unexamined Patent Application Publication No. 2014-120351) discloses a technique relating to such a system.

SUMMARY

However, the global ID includes, for example, 48 bits, and in PTL 1, a control device searches for devices while changing a hit value of the global ID in order from the most significant bit based on the binary search. In other words, when the global ID includes a broad bit range such as 48 bits, it takes too much time to complete the search for all the devices connected to the control device.

In view of this, it is an object of the present disclosure to provide a control device, a control system, and a search method which make it possible to reduce a time required to complete a search for devices.

A control device according to one aspect of the present disclosure is a control device which searches for a device to which a global identification (ID) including a manufacturer ID and a device ID is assigned in advance, by searching for the global ID, the manufacturer ID being set for each manufacturer using m bits, the device ID being uniquely set by each manufacturer using n bits, m being a natural number greater than or equal to 1, n being a natural number greater than or equal to 1, and the control device includes: a storage which stores the manufacturer ID; an inquirer which designates a possible range of the global ID at a time when m bits indicated by the manufacturer ID stored in the storage are fixed, and makes, to each of devices connected to the control device, an inquiry about whether a global ID assigned to the device is in the possible range that is designated; and a receiver which receives, from among the devices, a response to the inquiry made by the inquirer, the response indicating that the global ID is in the possible range, wherein the inquirer searches for the global ID assigned to the device, by repeating the inquiry while setting a new possible range to be designated by narrowing down the possible range according to the response received by the receiver.

A control system according to one aspect of the present disclosure is a control system which searches for a device to which a global identification (ID) including a manufacturer ID and a device ID is assigned in advance, by searching for the global ID, the manufacturer ID being set for each manufacturer using m bits, the device ID being uniquely set by each manufacturer using n bits, m being a natural number greater than or equal to 1, n being a natural number greater than or equal to 1, and the control system includes: a control device; and devices connected to the control device, wherein the control device includes: a storage which stores the manufacturer ID; an inquirer which designates a possible range of the global ID at a time when m bits indicated by the manufacturer ID stored in the storage are fixed, and makes, to each of the devices connected to the control device, an inquiry about whether a global ID assigned to the device is in the possible range that is designated; and a receiver which receives, from among the devices, a response to the inquiry made by the inquirer, the response indicating that the global ID is in the possible range, each of the devices makes the response when the global ID assigned to the device is in the possible range designated by the inquirer, and the inquirer searches for the global ID assigned to the device, by repeating the inquiry while setting a new possible range to be designated by narrowing down the possible range according to the response received by the receiver.

A search method according to one aspect of the present disclosure is a search method for searching for a device to which a global identification (ID) including a manufacturer ID and a device ID is assigned in advance and which is connected to a control device, by searching for the global ID, the manufacturer ID being set for each manufacturer using m bits, the device ID being uniquely set by each manufacturer using n bits, m being a natural number greater than or equal to 1, n being a natural number greater than or equal to 1, and the search method includes: designating a possible range of the global ID at a time when m bits indicated by the manufacturer ID stored in a storage included in the control device are fixed, and making, to each of devices connected to the control device, an inquiry about whether a global ID assigned to the device is in the possible range that is designated; and receiving, from among the devices, a response to the inquiry made by the inquirer, the response indicating that the global ID is in the designated range, wherein in the designating and making, the global ID assigned to the device is searched for by repeating the inquiry while a new possible range to be designated is set by narrowing down the possible range according to the response received in the receiving.

The control device, control system, and search method according to the aspects of the present disclosure make it possible to reduce a time required to compete a search for devices.

BRIEF DESCRIPTION OF DRAWINGS

The figures depict one or more implementations in accordance with the present teaching, by way of examples only, not by way of limitations. In the figures, like reference numerals refer to the same or similar elements.

FIG. 2 is a diagram illustrating an example of a global ID according to the embodiment;

FIG. 3 is a diagram illustrating an example of manufacturer IDs stored in a storage according to the embodiment;

DETAILED DESCRIPTION OF THE EMBODIMENTS

Hereinafter, embodiments of the present disclosure will be described in detail with reference to the drawings. It is to be noted that the embodiments described below each show a specific example of the present disclosure. Therefore, the numerical values, structural elements, the arrangement and connection of the structural elements, steps (processes), and the order of the steps, etc. shown in the following embodiments are mere examples, and are not intended to limit the present disclosure. As such, among the structural elements in the following embodiments, those not recited in any one of the independent claims which indicate the broadest inventive concepts will be described as optional structural elements.

It is also to be noted that the respective figures are schematic diagrams and are not necessarily precise illustrations. Additionally, the same structural elements are given the same reference signs in the figures.

Embodiment

Hereinafter, an embodiment will be described with reference to FIG. 1 to FIG. 6.

[Configuration of System]

Figure 1:
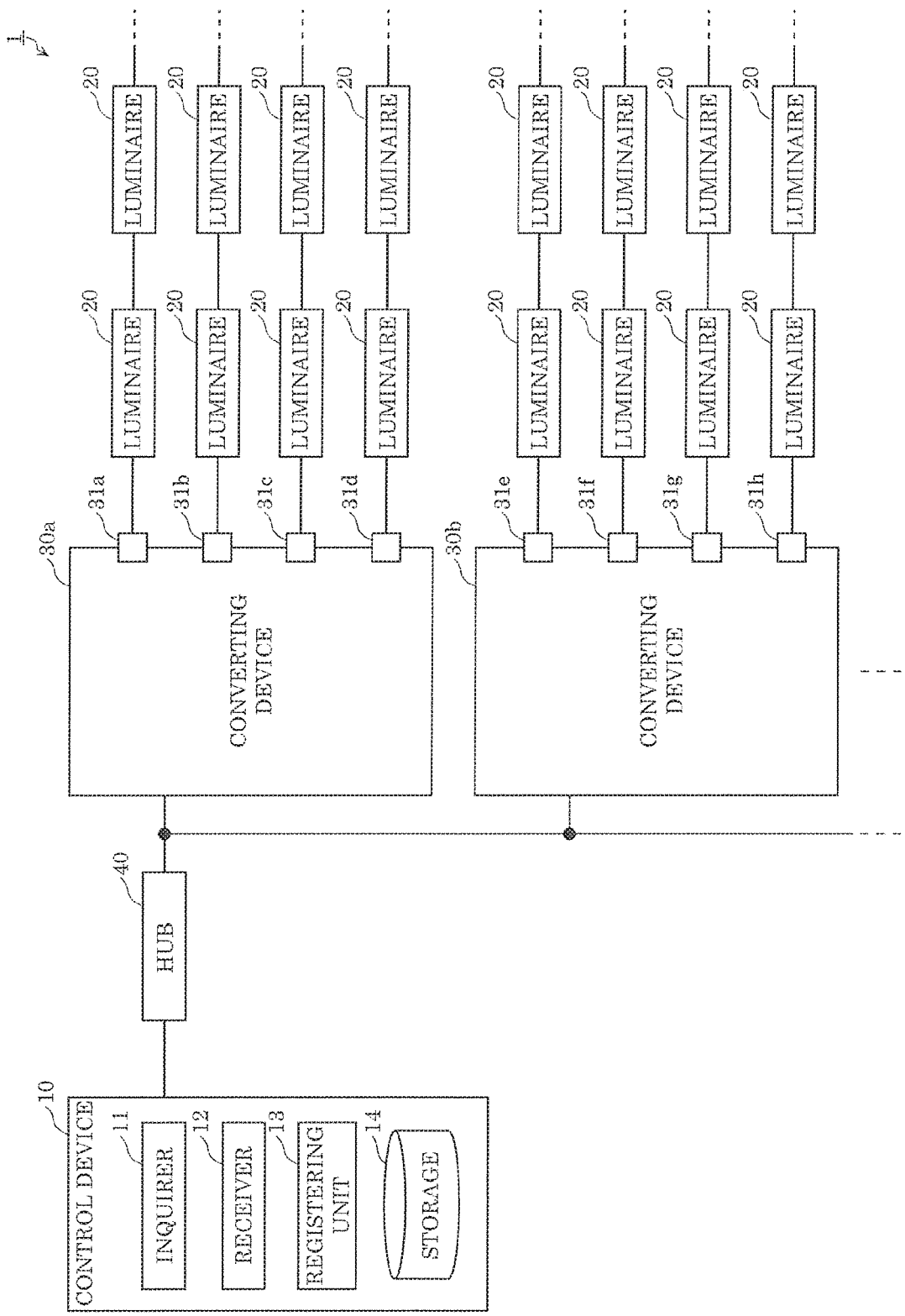
FIG. 1 is a block diagram illustrating an example of a control system according to an embodiment.

FIG. 1 is a block diagram illustrating an example of control system 1 according to the embodiment.

Control system 1 includes control device 10 and devices connected to control device 10. It is to be noted that the devices connected to control device are described as luminaires 20 in the embodiment. Control device 10 is connected to converting devices 30a, 30b, . . . via hub 40, and luminaires 20 are connected to connectors 31a to 31d included in converting device 30a and connectors 31e to 31h included in converting device 30b. Hereinafter, converting devices 30a, 30b, . . . are also collectively referred to as converting device 30, and connectors 31a to 31h are also collectively referred to as connector 31. For example, up to 32 luminaires 20 can be connected to connector 31 by what is called a daisy chain. As illustrated in FIG. 1, at least two luminaires 20 are connected to each of connectors 31 in the embodiment. It is to be noted that hereinafter a case where luminaire 20 is connected to control device 10 includes a case where luminaire 20 is connected to control device 10 via converting device 30.

Control device 10 is a control device which searches for luminaires 20 connected to the control device, according to, for example, the Remote Device Management (RDM) protocol. It is to be noted that that control device 10 searches for luminaire 20 means that control device 10 searches for a global ID assigned to luminaire 20 connected to control device 10, and specifically means that control device 10 obtains the global ID assigned to luminaire 20 connected to control device 10. Accordingly, control device 10 makes it possible to determine what global ID luminaire 20 connected to control device 10 is assigned, and control luminaire 20 using the determined global ID. Control device 10 is, for example, a lighting control console, a Personal Computer (PC), or a device such as a tablet terminal. The Ethernet (registered trademark) protocol is used for communication between control device 10 and converting devices 30, and the RDM protocol is used for communication between converting devices 30 and luminaires 20. The RDM protocol is a protocol allowing two-way communication using DMX512. A configuration of control device 10 will be described in detail later.

Luminaire 2 is, for example, a luminaire corresponding to the RDM protocol. Luminaire 20 is a luminaire including, for example, a light-emitting diode (LED) as a light source. It is to be noted that luminaire 20 may be a luminaire including another light source. In addition, a storage (not shown) included in luminaire 20 stores a global ID assigned to luminaire 20 in advance. The following describes a global ID with reference to FIG. 2.

FIG. 2 is a diagram illustrating an example of the global ID according to the embodiment.

The global ID is an ID including a manufacturer ID set for each manufacturer using m bits, and a device ID uniquely set by each manufacturer using n bits, m being a natural number greater than or equal to 1, n being a natural number greater than or equal to 1. In other words, the global ID is identification information unique to luminaire 20. It is to be noted that the manufacturer ID set for each manufacturer using m bits is also called an ID including m bits available to each manufacturer. In addition, the device ID uniquely set by each manufacturer using n bits is also called an ID which each manufacturer uniquely assigns a product of the manufacturer. The global ID includes, for example, higher-order m bits and lower-order n bits. As illustrated in FIG. 2, the manufacturer ID includes, for example, 16 bits (m=16), the device ID includes, for example, 32 bits (n=32), and the global ID includes 48 bits (m+n=48) consisting of higher-order 16 bits and lower-order 32 bits. It is to be noted that hereinafter, the global ID and the manufacturer ID are expressed hexadecimally. A possible total range of the global ID is from 0x000000000000 to 0xffffffffffff. Specifically, luminaire 20 connected to control device 10 is assigned the global ID in a range from 0x000000000000 to 0xffffffffffff. When, for example, 0x074f is set as the manufacturer ID, a manufacturer using the manufacturer ID assigns, to luminaire 20 of the manufacturer, the global ID in a range from 0x074f00000000 to 0x074fffffffff. With this, luminaire 20 to which the global ID is assigned can be identified by the global ID.

When the global ID assigned to luminaire 20 is in a range designated in an inquiry made by inquirer 11 to be described later, luminaire 20 responds to the inquiry.

Each of converting devices 30 transmits a signal received from control device 10 to luminaire 20. Converting device 30 performs conversion between the Ethernet (registered trademark) protocol and the RDM protocol. For example, when converting device 30 receives from control device 10 a signal compliant with the Ethernet (registered trademark) protocol, converting device converts the signal into a signal compliant with the RDM protocol and transmits the converted signal to luminaire 20. Moreover, for example, when converting device 30 receives from luminaire 20 a signal compliant with the RDM protocol, converting device 30 converts the signal into a signal compliant with the Ethernet (registered trademark) protocol and transmits the converted signal to control device 10.

[Configuration of Control Device]

Next, a configuration of control device 10 will be described in detail.

Control device 10 includes inquirer 11, receiver 12, registering unit 13, and storage 14.

Storage 14 stores at least one manufacturer ID. Manufacturer IDs stored in storage 14 will be described with reference to FIG. 3.

FIG. 3 is a diagram illustrating an example of the manufacturer IDs stored in storage 14 according to the embodiment.

For example, when a user already knows manufacturers of respective luminaires 20 connected to control device 10, the manufacturer IDs of the manufacturers known to the user are stored into storage 14 in advance. For example, it is assumed that storage 14 has stored three manufacturer IDs "0x1111," "0x2222," and "0x3333" as illustrated in FIG. 3.

It is to be noted that each of storage 14 and the storage included in luminaire 20 is a semiconductor memory such as a read-only memory (ROM) which stores a program and data, and is, for example, a nonvolatile memory such as an electrically erasable programmable read-only memory (EEPROM).

Inquirer 11 designates a possible range of a global ID when m bits indicated by a manufacturer ID stored in storage 14 are fixed, and makes, to each of luminaires 20 connected to control device 10, an inquiry about whether the global ID assigned to luminaire 20 is in the possible range that is designated. In addition, by repeating the inquiry while setting a new possible range to be designated by narrowing down the possible range according to the response received by receiver 12, inquirer 11 searches for the global ID assigned to luminaire 20. Operations performed by inquirer 11 will be described in detail later with reference to FIG. 4 to FIG. 6.

Receiver 12 receives, from among luminaires 20, a response indicating the presence of the global ID for the inquiry made by inquirer 11. Operations performed by receiver 12 will be described in detail later with reference to FIG. 4 to FIG. 6.

When a manufacturer ID included in the global ID of one of luminaires 20 is not stored in storage 14 in the case where receiver 12 has received the response from one luminaire 20, registering unit 13 stores the manufacturer ID of one luminaire 20 into storage 14. Operations performed by registering unit 13 will be described in detail later with reference to FIG. 6.

Inquirer 11, receiver 12, and registering unit 13 are implemented by a processor etc. which executes a control program stored in storage 14, but may be implemented by a microcomputer or a dedicated communication circuit etc.

[Operation by Control Device]

Next, operations performed by control device 10 will be described with reference to FIG. 4 to FIG. 6.

Figure 4:
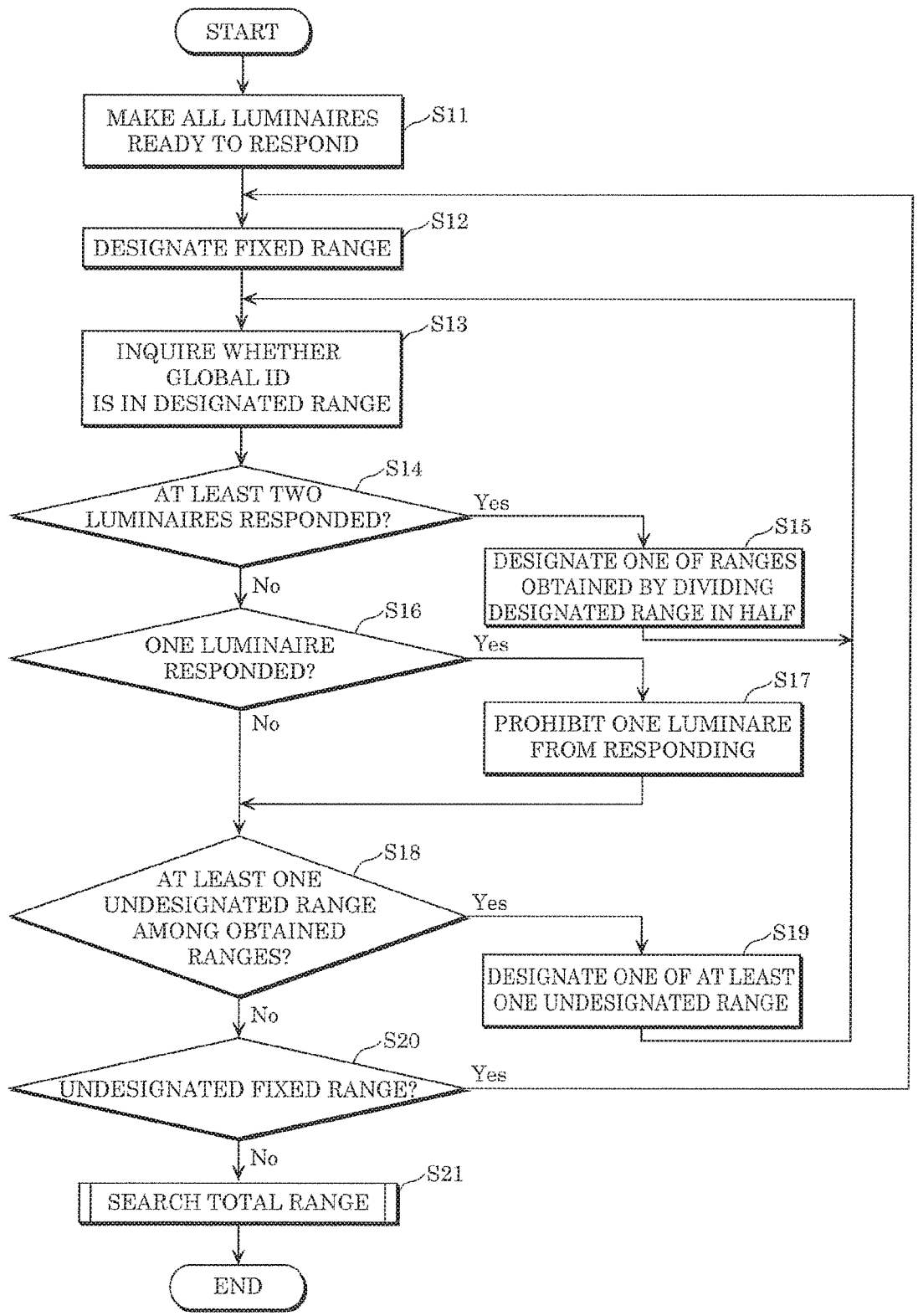
FIG. 4 is a flow chart illustrating an example of operations performed by a control device according to the embodiment.

FIG. 4 is a flow chart illustrating an example of the operations performed by control device 10 according to the embodiment.

First, inquirer 11 makes all luminaires 20 connected to control device ready to respond (step S11). Specifically, inquirer 11 transmits, to all luminaires 20 connected to control device 10, an instruction for permitting responding. As a result, in the case where the inquiry is made to each of luminaires 20 by inquirer 11, luminaire 20 responds to control device 10 when the inquiry is confirmed (as will be described later, when the global ID assigned to luminaire 20 is in the range designated in the inquiry).

It is to be noted that processes from step S12 to step S21 are performed for, for example, each connector 31 of converting device 30. For example, in order of connectors 31a, 31b, . . . , the processes from step S12 to step S21 are performed on luminaires 20 connected to each of connectors 31a, 31b, . . . (luminaires 20 connected to one connector by, for example, a daisy chain).

Next, inquirer 11 designates a possible range (hereinafter also referred to as a fixed range) of the global ID when higher-order m bits (16 bits) indicated by a manufacturer ID stored in storage 14 are fixed in a possible total range (48 bits) of the global ID (step S12). For example, inquirer 11 designates a fixed range in which "0x1111" is fixed as higher-order 16 bits indicated by the manufacturer ID stored in storage 14. Consequently, the fixed range is from 0x111100000000 to 0x1111ffffffff. The range will be described with reference to FIG. 5.

Figure 5:
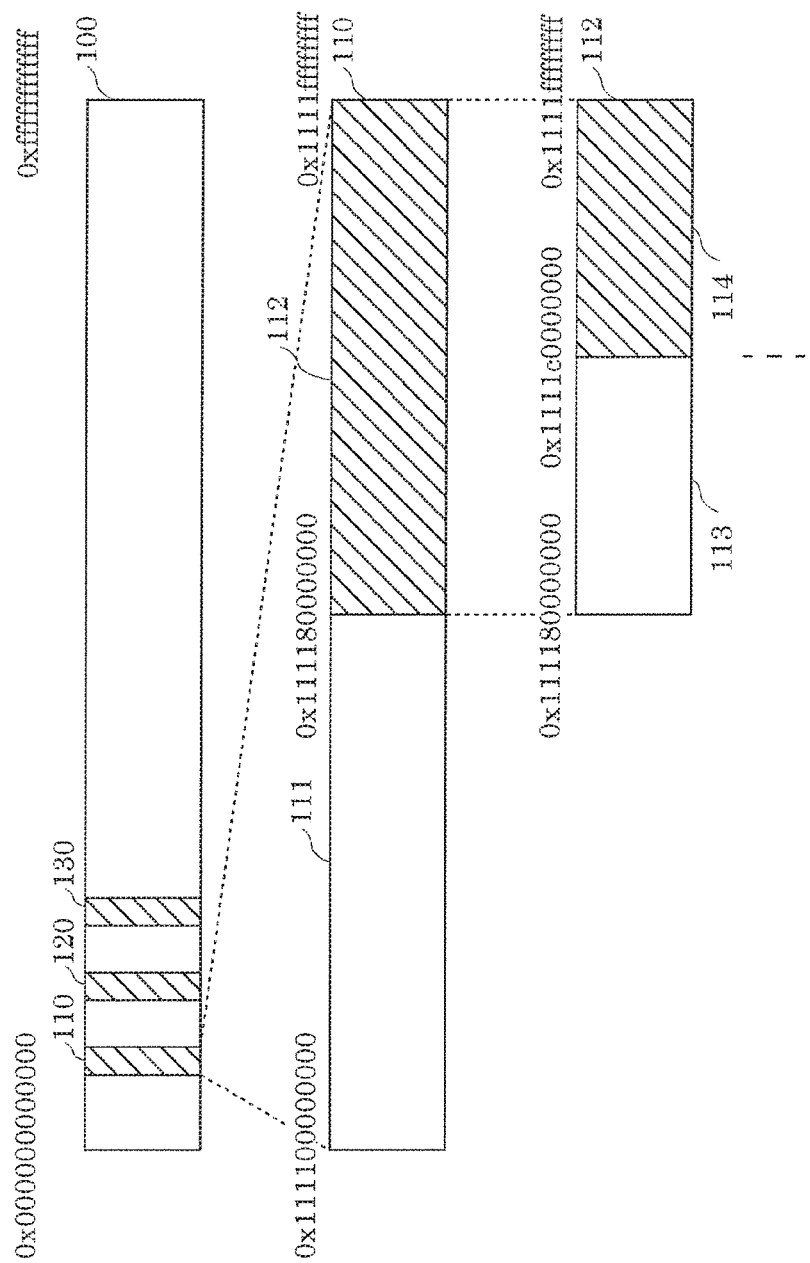
FIG. 5 is a schematic diagram illustrating a procedure for searching for a global ID by the control device according to the embodiment.

FIG. 5 is a schematic diagram illustrating a procedure for searching for a global ID by control device 10 according to the embodiment.

Range 100 indicated in FIG. 5 is a range from 0x000000000000 to 0xffffffffffff which is the total range of 48 bits. Range 110 is a range from 0x111100000000 to 0x1111ffffffff which is a fixed range in which "0x1111" is fixed as higher-order 16 bits indicated by the manufacturer ID. Similarly, range 120 is a range from 0x222200000000 to 0x2222ffffffff which is a fixed range in which "0x2222" is fixed as higher-order 16 bits indicated by the manufacturer ID. Likewise, range 130 is a range from 0x333300000000 to 0x3333ffffffff which is a fixed range in which "0x3333" is fixed as higher-order 16 bits indicated by the manufacturer ID. It is to be noted that ranges 110, 120, and 130 have a width of $2^{32}$, and range 100 has a width of $2^{48}$. Although the width of ranges 110, 120, and 130 is much smaller than that of range 100, FIG. 5 schematically makes the width of ranges 110, 120, and 130 appear greater than in reality. Inquirer 11 designates range 110 as the fixed range in which higher-order 16 bits "0x111" are fixed.

Next, inquirer 11 makes, to luminaires 20, an inquiry about whether the global ID is in the designated range (range 110) (step S13). When the global ID assigned to luminaire 20 having received the inquiry is in range 110, luminaire 20 makes, by transmitting information including, for example, the global ID assigned to luminaire 20, a response indicating the presence of the global ID for the inquiry. As a result, receiver 12 receives, from among luminaires 20, the response indicating the presence of the global ID for the inquiry made by inquirer 11.

Next, receiver 12 determines whether receiver 12 has received the response from at least two luminaires 20 among luminaires 20 (step S14). When at least two luminaires 20 make the response to control device 10, a collision occurs to damage a signal to be received by receiver 12. Specifically, when the collision occurs, information including the global ID and transmitted by luminaire 20 is damaged, and thus control device 10 makes it possible to recognize the global ID of one luminaire 20 only when receiver 12 receives, from one luminaire 20, the response to the inquiry made by inquirer 11. In other words, when receiver 12 receives, from at least two luminaires 20, the response to the inquiry made by inquirer 11, control device 10 does not make it possible to recognize the global IDs of at least two luminaires 20 which have made the response. It is to be noted that receiver 12 determines whether receiver 12 has received, from at least two luminaires 20, information indicating the presence of the global ID, depending on whether an abnormal signal generated in response to the collision is detected.

When receiver 12 has received the response from at least two luminaires 20 (Yes in step S14), inquirer 11 designates one of ranges obtained by dividing in half the range designated in step S13 (step S15). As illustrated in FIG. 5, inquirer 11 designates one of ranges 111 and 112 obtained by dividing range 110 in half. Range 111 indicates from 0x111100000000 to 0x11117fffffff. Range 112 indicates from 0x111180000000 to 0x1111ffffffff. Although inquirer 11 is not particularly limited to designate a specific one of the ranges obtained by dividing the range in half, inquirer 11 designates, for example, one of the ranges which has a greater value. Accordingly, inquirer 11 designates range 112. Subsequently, the processes of step S13 and step S14 are performed for range 112. For example, as illustrated in FIG. 5, when inquirer 11 has made, to luminaires 20, a new inquiry about whether the global ID is in range 112, and receiver 12 has received the response from at least two luminaires 20, inquirer 11 designates range 114 from among ranges 113 and 114 obtained by dividing range 112 in half. In this way, the processes from step S13 to step S15 are repeated until at least two luminaires 20 do not respond in the process of step S14.

When receiver 12 has received no response from at least two luminaires (No in step S14), receiver 12 determines whether receiver 12 has received the response from one luminaire 20 among luminaires 20 (step S16). When one luminaire 20 among luminaires 20 makes the response to control device 10, a collision does not occur, and undamaged information including the global ID and transmitted by one luminaire 20 is received. As a result, it is possible to determine whether the response from one luminaire 20 has been received.

When receiver 12 has received the response from one luminaire 20 (Yes in step S16), control device 10 obtains the global ID of one luminaire 20. As stated above, because the processes subsequent to step S12 are performed, for example, for each connector 31, control device 10 makes it possible to determine to which connector 31 of which converting device 30 luminaire 20 to which the obtained global ID is assigned is connected. Accordingly, this completes the search for luminaire 20 in the range for which the inquiry is made in step S13.

Next, inquirer 11 prohibits one luminaire 20 from responding (step S17). Specifically, inquirer 11 transmits, to one luminaire 20, an instruction for prohibiting responding to a new inquiry from inquirer 11. Consequently, when luminaire 20 for which the search for the global ID assigned to luminaire has been completed receives an inquiry from inquirer 11 in future, luminaire does not respond to control device 10 even if the global ID of luminaire 20 is in a range for which the inquiry is made.

Moreover, when receiver 12 has received no response from any of luminaires 20 (No in step S16), control device 10 makes it possible to determine that the global ID is not in the range for which the inquiry is made in step S13, and thus the search for luminaire 20 in the range is completed.

Next, inquirer 11 determines whether at least one undesignated range is included in ranges obtained by dividing each of the ranges in half in step S15 (step S18). Here, the at least one undesignated range includes, for example, ranges 111 and 113.

When inquirer 11 has determined that the at least one undesignated range is included in the ranges obtained by dividing each of the ranges in half (Yes in step S18), inquirer 11 designates one of the at least one undesignated range (step S19). Although inquirer 11 is not particularly limited to designate a specific undesignated range, inquirer 11 designates, for example, a broader undesignated range. The global ID in the fixed range (e.g., range 110) is searched for by repeating the processes from step S13 to step S19.

When inquirer 11 has determined that the at least one undesignated range is not included in the ranges obtained by dividing each of the ranges in half (No in step S18), inquirer 11 determines whether an undesignated fixed range is present (step S20). A state in which no undesignated range is included in the ranges obtained by dividing each of the ranges in half is also called a state in which the search for the global ID assigned to luminaire 20 in the fixed range designated in step S12 is completed. In the embodiment, storage 14 stores, for example, three manufacturer IDs, and range 120 corresponding to manufacturer ID "0x2222" and range 130 corresponding to manufacturer ID "0x3333" are undesignated as fixed ranges. Accordingly, when inquirer 11 has determined that the undesignated fixed range is present (Yes in step S20), the processes from step S13 to step S20 are repeated for the undesignated fixed range. It is to be noted that although inquirer 11 is not particularly limited to designate a specific fixed range corresponding to a specific manufacturer ID when storage 14 stores manufacturer IDs, inquirer 11 designates, for example, fixed ranges in ascending order of values. In this way, the global ID assigned to luminaire 20 included in the fixed range corresponding to the manufacturer ID stored in storage 14 is searched for.

Subsequently, when inquirer 11 has determined that the undesignated fixed range is not present (No in step S20), the search for the global ID is performed in a possible total range of the global ID (step S21). A process of step S21 will be described with reference to FIG. 6.

Figure 6:
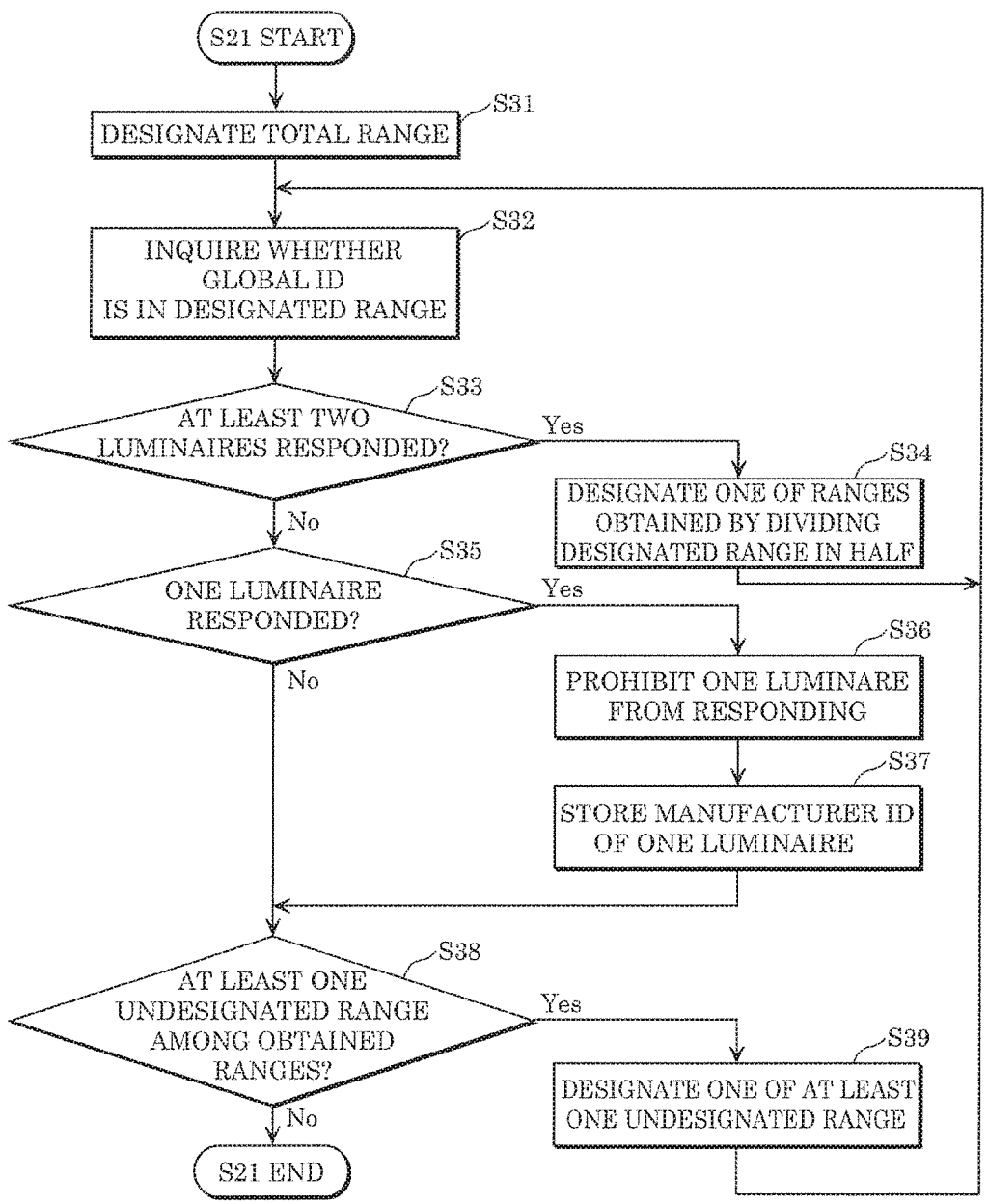
FIG. 6 is a flow chart illustrating an example of operations performed by the control device according to the embodiment at a time when the control device searches a total range after completing a search in a fixed range.

FIG. 6 is a flow chart illustrating an example of operations performed by control device 10 according to the embodiment at a time when control device searches a total range after completing a search in a fixed range.

First, inquirer 11 designates a possible total range of a global ID (step S31). The possible total range of the global is a range of 48 bits, and is range 100 illustrated in FIG. 5.

Next, inquirer 11 makes, to each of luminaires 20, an inquiry about whether the global ID is in the designated range (range 100) (step S32). It is to be noted that although the global IDs of luminaires 20 for which the search in ranges 110, 120, and 130 is completed are in range 100, luminaires 20 do not respond to the inquiry, because luminaires 20 are prohibited from responding as a result of the process of step S17. Specifically, the inquiry is substantially made about whether the global ID is present other than in ranges 110, 120, and 130.

Processes from step S32 to step S36 are the same as the processes from step S13 to step S17, except that the range of 48 bits (range 100) is initially designated as a range designated when inquirer 11 makes an inquiry. Accordingly, description thereof is omitted.

In the case where receiver 12 has received the response from one luminaire 20 in step S35, registering unit 13 stores, when the manufacturer ID included in the global ID of one luminaire 20 is not stored in storage 14, the manufacturer ID of one luminaire 20 into storage 14 (step S37). A series of processes in step S21 is for searching a global ID including a manufacturer ID not stored in storage 14, and thus registering unit 13 stores, into storage 14, the manufacturer ID included in the global ID assigned to one luminaire 20.

Moreover, processes of step S38 to step S39 are the same as the processes of step S18 and step S19, except that the range of 48 bits (range 100) is initially designated as a range designated when inquirer 11 makes an inquiry. Accordingly, description thereof is omitted.

In this way, the global ID including the manufacturer ID not stored in storage 14 is searched for through the series of processes in step S21. In addition, the manufacturer ID included in the searched global ID is stored into storage 14.

Advantageous Effects, Etc.

When the global ID includes a broad bit range such as 48 bits, it takes too much time to complete the search for all the devices connected to the control device.

In view of this, control device 10 according to the embodiment is a control device which searches for a device (e.g., luminaire 20) to which a global identification (ID) including a manufacturer ID and a device ID is assigned in advance, by searching for the global ID, the manufacturer ID being set for each manufacturer using m bits, the device ID being uniquely set by each manufacturer using n bits, m being a natural number greater than or equal to 1, n being a natural number greater than or equal to 1. Control device 10 includes storage 14 which stores the manufacturer ID. Moreover, control device 10 includes inquirer 11 which designates a possible range of the global ID at a time when m bits indicated by the manufacturer ID stored in storage 14 are fixed, and makes, to each of devices connected to control device 10, an inquiry about whether a global ID assigned to the device is in the possible range that is designated. Furthermore, control device 10 includes receiver 12 which receives, from among the devices, a response to the inquiry made by inquirer 11, the response indicating that the global ID is in the possible range. Inquirer 11 searches for the global ID assigned to the device, by repeating the inquiry while setting a new possible range to be designated by narrowing down the possible range according to the response received by receiver 12.

Moreover, control system 1 according to the embodiment is a control system which searches for a device to which a global identification (ID) including a manufacturer ID and a device ID is assigned in advance, by searching for the global ID, the manufacturer ID being set for each manufacturer using m bits, the device ID being uniquely set by each manufacturer using n bits, m being a natural number greater than or equal to 1, n being a natural number greater than or equal to 1. Control system 1 includes control device 10 and devices connected to control device 10. Control device 10 includes storage 14 which stores the manufacturer ID. Moreover, control device 10 includes inquirer 11 which designates a possible range of the global ID at a time when m bits indicated by the manufacturer ID stored in storage 14 are fixed, and makes, to each of devices connected to control device 10, an inquiry about whether a global ID assigned to the device is in the possible range that is designated. Furthermore, control device 10 includes receiver 12 which receives, from among the devices, a response to the inquiry made by inquirer 11, the response indicating that the global ID is in the possible range. Each of the devices makes the response when the global ID assigned to the device is in the possible range designated by inquirer 11. Inquirer 11 searches for the global ID assigned to the device, by repeating the inquiry while setting a new possible range to be designated by narrowing down the possible range according to the response received by receiver 12.

Moreover, the search method according to the embodiment is a search method for searching for a device to which a global identification (ID) including a manufacturer ID and a device ID is assigned in advance and which is connected to control device 10, by searching for the global ID, the manufacturer ID being set for each manufacturer using m bits, the device ID being uniquely set by each manufacturer using n bits, m being a natural number greater than or equal to 1, n being a natural number greater than or equal to 1. The search method includes designating a possible range of the global ID at a time when m bits indicated by the manufacturer ID stored in storage 14 included in control device 10 are fixed, and making, to each of devices connected to control device 10, an inquiry about whether a global ID assigned to the device is in the possible range that is designated. Furthermore, the search method includes receiving, from among the devices, a response to the inquiry made by the inquirer, the response indicating that the global ID is in the possible range. In the designating and making, the global ID assigned to the device is searched for by repeating the inquiry while a new possible range to be designated is set by narrowing down the possible range according to the response received in the receiving.

A device connected to control device 10 is assigned, for example, in advance, a global ID from a range of 48 bits including the manufacturer ID of 16 bits (m=16) and the device ID of 32 bits (n=32). Generally, when devices having the same function such as luminaires 20 are connected to control device 10, the devices are usually made by the same manufacturer. Consequently, for example, when a manufacturer of devices connected to control device 10 is known in advance, a user etc. stores the manufacturer ID of the manufacturer into storage 14 in advance. With this, it is possible to reduce a time required until the search for the devices (i.e., the search for global IDs) is completed, not by searching, for example, the range of 48 bits, a possible total range of a global ID, for the global ID, but by preferentially searching a range in which m bits (e.g., higher-order 16 bits) indicated by the manufacturer ID stored in storage 14 are fixed.

Moreover, control device 10 searches for the device using binary search. When receiver 12 receives the response from at least two of the devices, inquirer 11 designates one of ranges obtained by dividing in half the possible range designated when the inquiry corresponding to the response was made, and makes a new inquiry. Furthermore, when receiver 12 receives the response from only one of the devices or receives no response from the devices, inquirer 11 stops making the inquiry for the possible range designated when the inquiry corresponding to the response was made.

With this, it is possible to further reduce a time required until the search for the devices is completed, by preferentially searching, for the global ID, the range in which m bits indicated by the manufacturer ID stored in storage 14 are fixed, using binary search.

Moreover, inquirer 11 transmits to one of the devices an instruction for prohibiting the one of the devices from responding to a new inquiry, when receiver 12 receives the response from the one of the devices. In addition, inquirer 11 designates a possible total range of the global ID and makes the inquiry after the search for the global ID assigned to the device in the possible range at the time when m bits are fixed is completed.

For example, a device of a manufacturer indicated by a manufacturer ID not stored in storage 14 is sometimes connected to control device. Accordingly, when an undesignated range is not included in ranges obtained by dividing a range in half, that is, when a search in a range in which m bits indicated by a manufacturer ID stored in storage 14 are fixed is completed, a possible total range of a global ID is searched. Here, devices for which the search in the fixed range is completed are not ready to respond to a new inquiry made by inquirer 11. In other words, only the devices made by manufacturers indicated by manufacturer IDs not stored in storage 14 are ready to respond to the new inquiry made by inquirer 11. When the number of the devices connected to control device 10 and made by the manufacturers indicated by the manufacturer IDs not stored in storage 14 is small, it is possible to reduce a time required until a search for the devices is completed, because a search for a device is immediately completed even if the search is started from the possible total range of the global ID.

Moreover, control device 10 further includes registering unit 13 which stores a manufacturer ID of one of the devices into storage 14 when the manufacturer ID included in the global ID assigned to the one of the devices is not stored in storage 14, in the case where receiver 12 receives the response from the one of the devices.

For example, when control device 10 is used in a theater, a stage, or a studio, etc., devices connected to control device 10 are replaced with different ones or are relocated depending on a program or contents of an event in the theater or the stage, etc., or contents of filming in the studio. Every time this change is made, devices connected to control device 10 are searched for. Registering unit 13 accumulates in storage 14 manufacturer IDs, which are not stored in storage 14, of devices for which the search is completed, and thus it is possible to reduce a time required until the next and subsequent searches are completed. Furthermore, for example, when storage 14 stores no manufacturer ID, a search for each global ID of a corresponding one of devices connected to control device 10 is performed starting from a possible total range of the global ID. Accordingly, although a time required until the first search for the devices is completed is the same as before, it is possible to reduce a time required until the next and subsequent searches are completed.

Other Embodiments

Although control device 10, control system 1, and the search method according to the embodiment have been described above, the present disclosure is not limited to the aforementioned embodiment.

For example, although the search for luminaire 20 is performed for each connector 31 in the aforementioned embodiment, the present disclosure is not limited to this, and the search may be simultaneously performed for all connectors 31. In this case, the completion of the search for luminaire 20 allows control device 10 to determine what global ID luminaire 20 connected to control device 10 is assigned.

Moreover, for example, although luminaires 20 are connected to each connector 31 in the aforementioned embodiment, the present disclosure is not limited to this, and only one luminaire 20 may be connected to connector 31.

Furthermore, for example, although luminaires 20 are connected to control device 10 via converting device 30 in the aforementioned embodiment, the present disclosure is not limited to this, and luminaires 20 may be directly connected to control device 10.

Moreover, for example, although the device connected to control device 10 is luminaire 20 in the aforementioned embodiment, the present disclosure is not limited to this, and a device connected to control device 10 is not particularly limited.

Furthermore, for example, although the ranges are designated in ascending order of the values when storage 14 stores the manufacturer IDs in the aforementioned embodiment, the present disclosure is not limited to this, and ranges may be designated in descending order of values.

Moreover, for example, although the range having the greater value among the ranges obtained by dividing the range in half is designated in step S15 in the aforementioned embodiment, the present disclosure is not limited to this, and a range having a less value may be designated.

Furthermore, for example, although the broader undesignated range among the undesignated ranges is designated in step S19 in the aforementioned embodiment, the present disclosure is not limited to this, and a narrower undesignated range may be designated.

Furthermore, the present disclosure can be implemented not only as control device 10 but also as a method including steps (processes) performed by the respective structural elements included in control device 10.

For example, these steps may be executed by a computer (computer system). The present disclosure can be implemented as a program which causes the computer to execute the steps included in the method. In addition, the present disclosure can be implemented as a non-transitory computer-readable recording medium on which the program is recorded, such as a CD-ROM.

For example, when the present disclosure is implemented as a program (software), each step is performed by executing the program using hardware resources such as a CPU, a memory, and an input/output circuit of a computer. Specifically, each step is performed by the CPU obtaining data from the memory or the input/output circuit, etc. and calculating the data, and outputting the results of the calculation to the memory or the input/output circuit, etc.

Moreover, each structural element included in control device 10 according to the aforementioned embodiment may be implemented as a dedicated communication circuit or a general-purpose circuit.

Furthermore, each structural element included in control device 10 according to the aforementioned embodiment may be implemented as large-scale integration (LSI) which is an integrated circuit (IC).

Moreover, the integrated circuit is not limited to the LSI, and may be implemented as a dedicated communication circuit or a general-purpose processor. A Field Programmable Gate Array (FPGA) which is programmable or a reconfigurable processor which allows reconfiguration of the connections and settings of circuit cells inside the LSI may be used.

In addition, if circuit integration technology that replaces LSI appears through advancement of semiconductor technology or other derived technology, that technology can be naturally used to carry out circuit integration of each structural element included in control device 10.

While the foregoing has described one or more embodiments and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

What is claimed is:

1. A control device, implemented at least partially by hardware, which searches for a device to which a global identification (ID) including a manufacturer ID and a device ID is assigned in advance, by searching for the global ID, the manufacturer ID being set for each manufacturer using m bits, the device ID being uniquely set by each manufacturer using n bits, m being a natural number greater than or equal to 1, n being a natural number greater than or equal to 1, the control device comprising:
- a storage which stores the manufacturer ID;
- an inquirer which designates a possible range of the global ID at a time when the m bits used by the manufacturer ID stored in the storage are fixed, and makes, to each of devices connected to the control device, an inquiry about whether the global ID is in the possible range; and
- a receiver which receives, from each of the connected devices, a response to the inquiry made by the inquirer, the response indicating that the global ID is in the possible range,
- wherein the inquirer further searches for the global ID by repeating the inquiry while setting a new possible range by narrowing down the possible range according to at least one of the responses received by the receiver.

2. The control device according to claim 1, wherein the control device searches for the device using binary search, and the inquirer is configured to:
- when the receiver receives the response from at least two of the connected devices, set the new possible range by dividing in half the possible range, and make a new inquiry with the new possible range; and
- when the receiver receives the response from only one of the connected devices or receives no response from the connected devices, stop searching for the global ID.

3. The control device according to claim 1, wherein the inquirer is configured to:
- transmit to the one of the connected devices an instruction for prohibiting the one of the connected devices from responding to a new inquiry, when the receiver receives the response from the one of the connected devices; and
- designate a possible total range of the global ID and make the inquiry after the searching for the global ID in the possible range is completed.

4. The control device according to claim 1, further comprising a registering unit which stores a manufacturer ID of one of the connected devices into the storage of the control device when the manufacturer ID included in the global ID assigned to the one of the connected devices is not stored in the storage, in the case where the receiver receives the response from the one of the connected devices.

5. The control device according to claim 2, wherein, when the receiver receives the response from the only one of the connected devices, the receiver acquires the global ID from the only one of the connected devices.

6. The control device according to claim 1, wherein:
- the global ID is m+n bits, and
- the m bits are upper bits of the global ID.

7. A control system which searches for a device to which a global identification (ID) including a manufacturer ID and a device ID is assigned in advance, by searching for the global ID, the manufacturer ID being set for each manufacturer using m bits, the device ID being uniquely set by each manufacturer using n bits, m being a natural number greater than or equal to 1, n being a natural number greater than or equal to 1, the control system comprising:
- a control device implemented at least partially by hardware; and
- devices connected to the control device,
- wherein the control device includes:
- a storage which stores the manufacturer ID;
- an inquirer which designates a possible range of the global ID at a time when the m bits used by the manufacturer ID stored in the storage are fixed, and makes, to each of the devices connected to the control device, an inquiry about whether the global ID is in the possible range; and
- a receiver which receives, from among the connected devices, a response to the inquiry made by the inquirer, the response indicating that the global ID is in the possible range, wherein each of the connected devices makes the response when the global ID is in the possible range, and
- the inquirer further searches for the global ID, by repeating the inquiry while setting a new possible range by narrowing down the possible range according to at least one of the response received by the receiver.

8. A search method, implemented by a control device, for searching for a device to which a global identification (ID) including a manufacturer ID and a device ID is assigned in advance and which is connected to the control device, by searching for the global ID, the manufacturer ID being set for each manufacturer using m bits, the device ID being uniquely set by each manufacturer using n bits, m being a natural number greater than or equal to 1, n being a natural number greater than or equal to 1, the search method comprising:
- designating a possible range of the global ID at a time when the m bits used by the manufacturer ID stored in a storage included in the control device are fixed;
- making, to each of devices connected to the control device, an inquiry about whether the global ID is in the possible range; and
- receiving, from each of the connected devices, a response to the inquiry made by the inquirer, the response indicating that the global ID is in the possible range,
- wherein repeating the inquiry while a new possible range is set by narrowing down the possible range according to at least one of the responses received.

* * * * *